(12) United States Patent
Bianco

(10) Patent No.: US 9,290,103 B2
(45) Date of Patent: Mar. 22, 2016

(54) EVSE CONTROLLER SYSTEM

(71) Applicant: James S. Bianco, Suffield, CT (US)

(72) Inventor: James S. Bianco, Suffield, CT (US)

(73) Assignee: Control Module, Inc., Enfield, CT (US)

( * ) Notice: Subject to any disclaimer, the term of this patent is extended or adjusted under 35 U.S.C. 154(b) by 523 days.

(21) Appl. No.: 13/761,714

(22) Filed: Feb. 7, 2013

(65) Prior Publication Data

US 2014/0049213 A1 Feb. 20, 2014

Related U.S. Application Data

(60) Provisional application No. 61/596,365, filed on Feb. 8, 2012.

(51) Int. Cl.
*H02J 7/00* (2006.01)
*B60L 11/18* (2006.01)

(52) U.S. Cl.
CPC ......... *B60L 11/1824* (2013.01); *B60L 11/1838* (2013.01); *Y02T 10/7005* (2013.01); *Y02T 90/121* (2013.01); *Y02T 90/128* (2013.01); *Y02T 90/14* (2013.01); *Y02T 90/163* (2013.01)

(58) Field of Classification Search
CPC ....................................................... Y02T 90/14
USPC ............................................................ 320/109
See application file for complete search history.

(56) References Cited

U.S. PATENT DOCUMENTS

| | | | | |
|---|---|---|---|---|
| 8,912,753 | B2 * | 12/2014 | Pudar et al. | 320/109 |
| 2009/0079388 | A1 * | 3/2009 | Reddy | 320/109 |
| 2010/0225475 | A1 * | 9/2010 | Karch et al. | 340/540 |
| 2011/0004358 | A1 * | 1/2011 | Pollack et al. | 700/297 |
| 2011/0202217 | A1 * | 8/2011 | Kempton | 701/22 |
| 2011/0258112 | A1 * | 10/2011 | Eder et al. | 705/39 |
| 2011/0279082 | A1 * | 11/2011 | Hagenmaier et al. | 320/109 |
| 2012/0229085 | A1 * | 9/2012 | Lau | 320/109 |
| 2012/0262112 | A1 * | 10/2012 | Ross | 320/109 |
| 2013/0020992 | A1 * | 1/2013 | Wu et al. | 320/109 |
| 2013/0127416 | A1 * | 5/2013 | Karner et al. | 320/109 |

* cited by examiner

*Primary Examiner* — Suresh Memula
(74) *Attorney, Agent, or Firm* — Alix, Yale & Ristas, LLP

(57) ABSTRACT

An EVSE controller system controls the supply of power to multiple charging stations for charging electric vehicles. A controller is interposed in a power line for controlling the flow of power to each charging station. An authorization station receives input from a vehicle operator for authorizing the supply of power at a given charging station. A vehicle detector is employed to automatically sense the presence of an electric vehicle at the charging station and to automatically terminate power supply to the charging station upon departure of the electric vehicle. Both level 1 and level 2 EVSE are operated by the controller system.

20 Claims, 11 Drawing Sheets

EVSE CONTROLLER SYSTEM

CROSS-REFERENCE TO RELATED APPLICATION

This application claims the priority of U.S. Provisional Patent Application No. 61/596,365 filed on Feb. 8, 2012, the entirety of which is incorporated herein by reference.

BACKGROUND

This disclosure relates generally to electric vehicle supply equipment (EVSE) employed for charging the battery power supply of an electric vehicle. More particularly, this disclosure relates to systems for providing publicly accessible power to level 1 and/or level 2 EVSE.

A key consideration in providing publicly available electric power to charge electric vehicles is to control the supply of the power, as well as to ensure that there is a proper accounting for the power supply and that the vehicle can be charged in a safe and in a secure manner.

SUMMARY

Briefly stated, an EVSE controller system comprises an EVSE charging station having an electrical outlet and an EVSE secured receptacle, such as a lock box, adjacent the outlet. A power line supplies electrical power to the outlet. An EVSE controller is interposed in the power line for controlling the flow of power to the outlet. An authorization station receives input from a vehicle operator and provides an input to the EVSE controller. A vehicle detector detects the presence of a vehicle at the charging station. An operator input at the authorization station generates an authorization signal to the controller for processing to provide a flow of power to the station outlet. The vehicle sensor also provides a signal for terminating authorization at the EVSE controller and terminating power from the outlet if the vehicle leaves the charging station.

The vehicle detector is preferably an ultrasonic sensor. The authorization station, in one embodiment, comprises a keyboard and a reader. In one preferred embodiment, a level 1 EVSE is received in the lock box and connected to the outlet at the charging station. The EVSE has a cord extendable from the lock box which connects with the battery charging terminal of the electric vehicle.

The EVSE controller system is preferably employed for applications involving multiple charging stations. A plurality of charging stations are each connected for communication with the EVSE controller. A plurality of vehicle detectors correspond to each charging station and generate a signal for ultimately terminating authorization at the EVSE controller if a vehicle leaves the charging station.

A controller system for a level 2 EVSE comprises a charging station with a level 2 EVSE mounted in a fixed position relative to an adjacent parking space. A power line supplies power to the charging station. An EVSE controller is interposed in the power line to selectively allow power to be supplied to the charging station. An authorization station communicates with the EVSE controller. A vehicle sensor senses the presence of a vehicle at the parking space. An input provided at the authorization station generates a signal to the EVSE controller to supply power to the charging station. The vehicle sensor provides a signal so that when a vehicle is no longer detected at the parking space, the EVSE controller terminates power and authorization to the charging station.

Multiple level 2 charging stations are preferably employed. The vehicle detector is preferably an ultrasonic detector and there is a vehicle detector for each of a plurality of parking spaces, each associated with a charging station. A plurality of charging stations each with a level 2 EVSE are connected for receiving power through the EVSE controller. In one embodiment, the authorization station comprises a keyboard which has keys corresponding to or designating various parking spaces for the charging stations.

A method for charging an electric vehicle comprises inputting information to authorize the usage of electric power at a charging station and controlling the supply of power at the charging station in response to the authorization. An electric vehicle is connected to receive power supplied at the charging station. The method includes detecting the presence of the electric vehicle at the charging station, charging the battery power supply of the electric vehicle and terminating the power supplied to the charging station upon no longer sensing the presence of the electric vehicle at the charging station.

The method further comprises placing the EVSE in a secured enclosure, connecting the EVSE to the electric vehicle and charging the battery power supply of the vehicle upon proper authorization.

DETAILED DESCRIPTION

Figure 1:
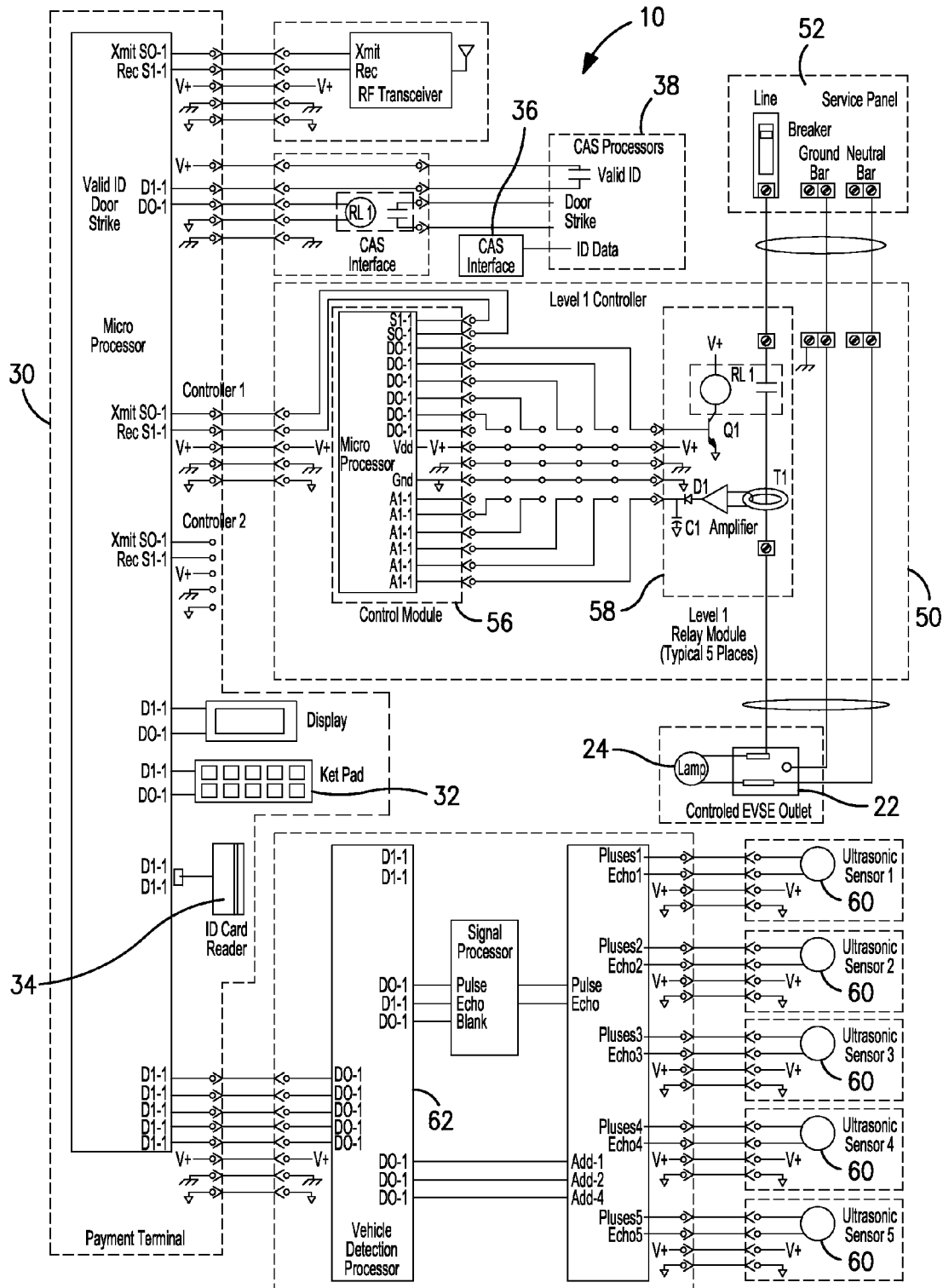
FIG. 1 is a schematic diagram of a controller system for a level 1 EVSE.

With reference to the drawings wherein like numerals represent like parts throughout the several figures, a controller system for a level 1 EVSE is generally designated by the numeral 10. Controller system 10 is incorporated into numerous substantially identical stations designated by the numeral 12. Each station 12 includes an EVSE secured receptacle, such as a lock box 14, which is dimensioned for receiving a level 1 EVSE 13 (only one illustrated). The lock box 14 is mounted in a fixed position adjacent a power outlet 16 positioned in close proximity to a parking space 18. The level 1 EVSE 13 includes a short cord 15 which extends through the lock box 14 for connection with the power outlet 16 of the station. The EVSE power cord 17 also extends from the lock box 14 and includes a connector 19 which connects with the terminal of the battery power supply of the electric vehicle 20.

Figure 2:
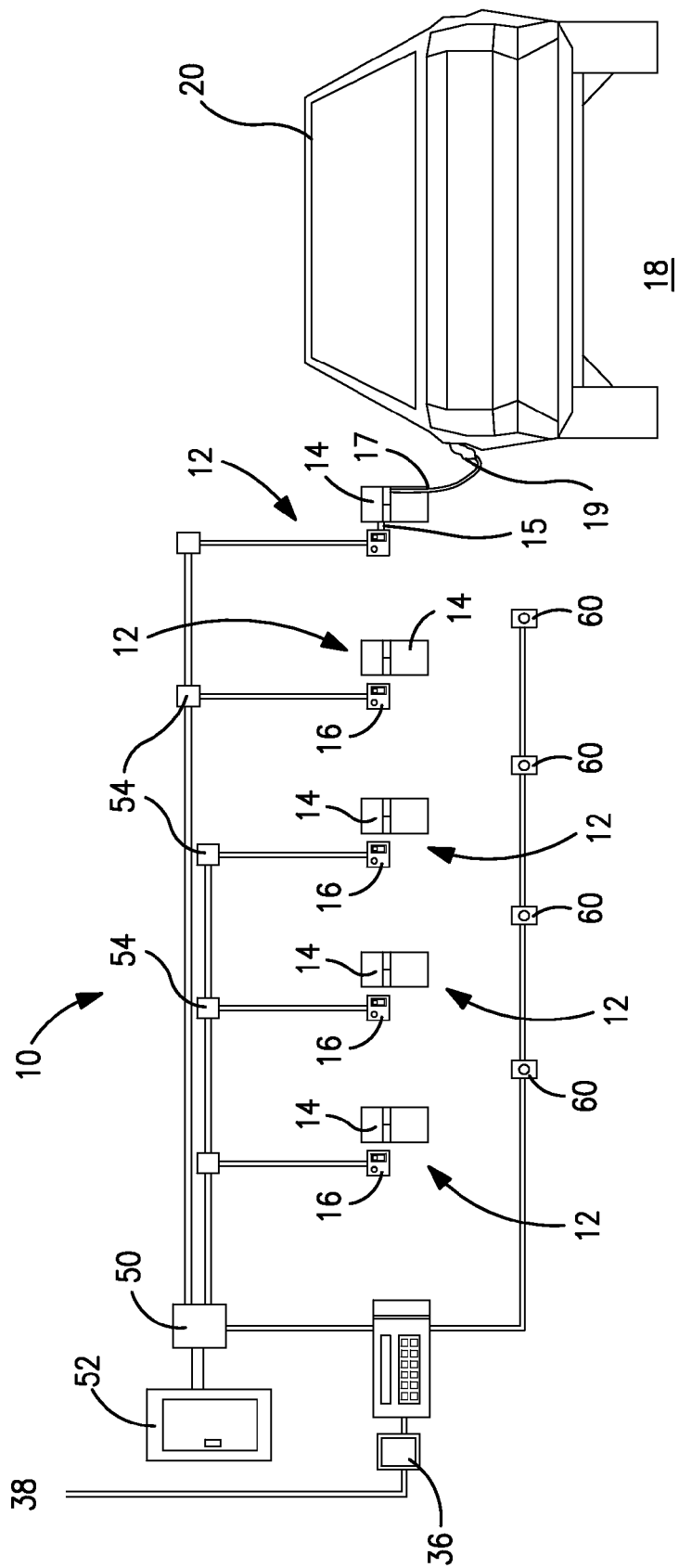
FIG. 2 is a schematic view of the level 1 EVSE controller system of FIG. 1 as incorporated into a multiple station installation for charging an electric vehicle.
Figure 4:
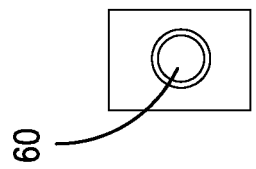
FIG. 4 is a front view of an ultrasonic sensor for a vehicle detector for the controller system of FIG. 1.
Figure 3:
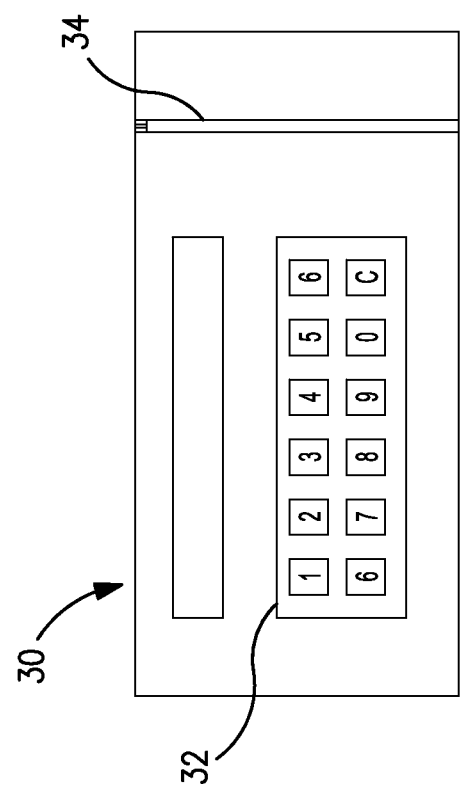
FIG. 3 is a front view of a payment terminal for the controller system of FIG. 1.
Figure 5:
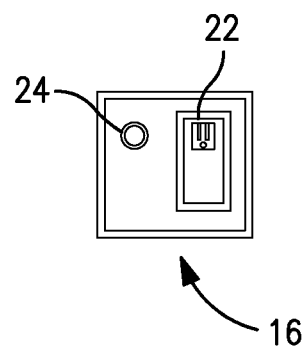
FIG. 5 is a front view of an EVSE outlet for the controller system of FIG. 1.
Figure 6:
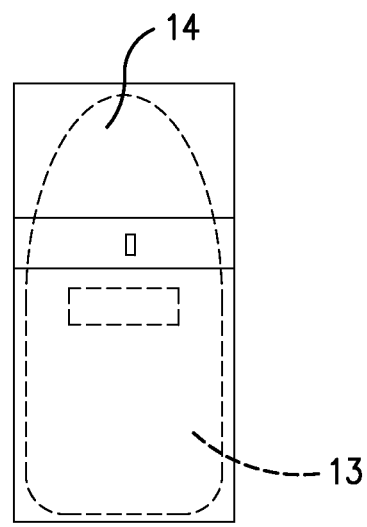
FIG. 6 is a front view of an EVSE lock box with a level 1 EVSE (shown in phantom) employed in the controller system of FIG. 1.
Figure 7A:
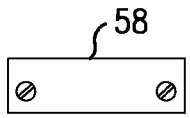
FIGS. 7A-7E are front, rear, top and side views of a relay module employed in the controller system of FIG. 1.
Figure 7D:
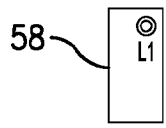
Figure 7E:
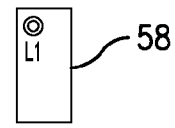
Figure 7C:
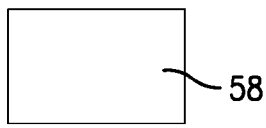
Figure 7B:
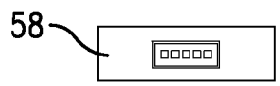
Figure 8A:
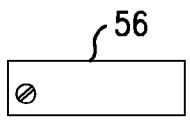
FIGS. 8A-8E are front, rear, top and side views of a control module employed in the controller system of FIG. 1.
Figure 8D:
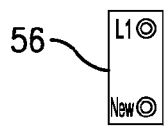
Figure 8E:
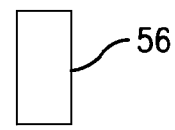
Figure 8C:
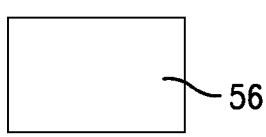
Figure 8B:
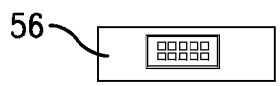
Figure 9A:
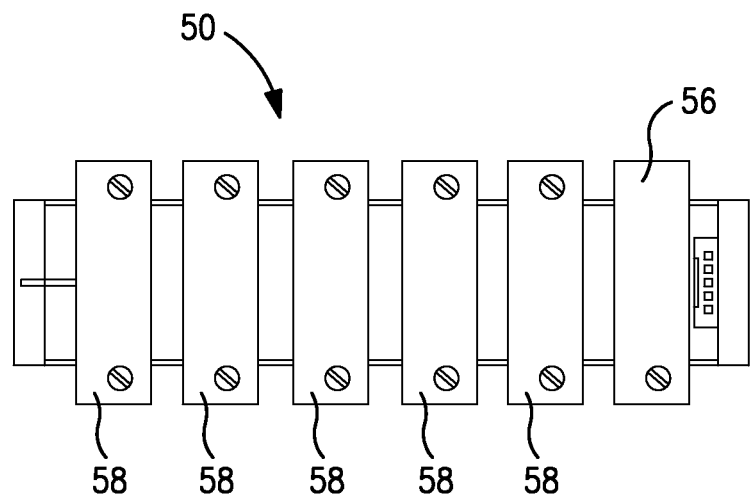
FIGS. 9A and 9B are a top and a side view of a level 1 EVSE controller employed in the controller system of FIG. 1.
Figure 9B:
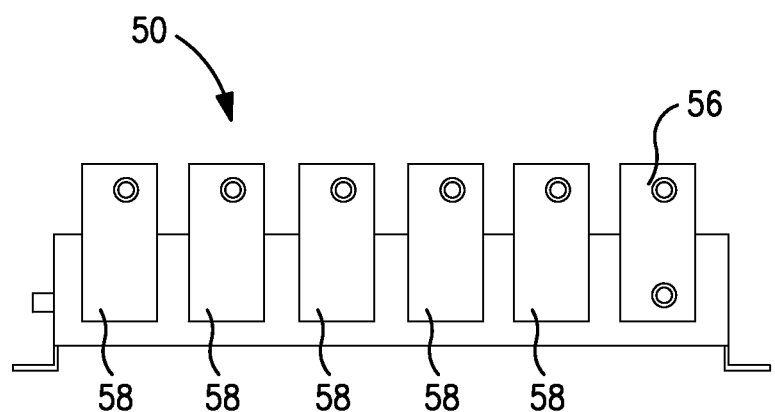

Preferably, there are multiple charging stations 12 (five illustrated in FIGS. 1 and 2) disposed in side-by-side relationship. Each power outlet 16 includes a 120 VAC controlled outlet 22 and an LED lamp 24 which indicates that power is supplied to the outlet.

An authorization or payment terminal 30 preferably services all of the charging stations. The payment terminal 30 includes a keyboard 32 for entering the charge station or parking space number, and in some applications, a pin or customer number. The payment terminal also includes a slot for an ID card reader 34 for entering a charge card or an authorization card. The payment terminal connects via a controlled access system (CAS) module 36 which connects with a CAS processor 38 at a remote location.

A level 1 EVSE controller 50 connects with the electrical service panel 52 which provides electric power to each of the junction boxes 54 for connection with each of the EVSE outlets 16. The level 1 controller 50 includes a control module 56 with a microprocessor and a relay module 58. The relay module 58 selectively controls power to the EVSE outlet 22. The controller 50 communicates with the terminal 30 and receives authorization input signals to allow the supply of power to a charging station 12 selected at the terminal 30.

Each parking space 18 includes a vehicle detector, preferably in the form of an ultrasonic sensor 60. Each ultrasonic sensor 60 detects the presence of the vehicle at the corresponding parking space and provides an input to a vehicle detection processor 62. The processor 62 communicates via the payment terminal 30 to the level 1 EVSE controller 50. The vehicle detector 60 functions so that when the vehicle leaves the parking space (the presence signal ceases), the power supply is terminated by the EVSE controller 50 until a new input which authorizes the supply of power to the specific station (which may be selected at the keyboard 32 or a reader at the payment station) is provided.

It will be appreciated that the level 1 EVSE 13 is placed in and secured by the lock box 14. The level 1 EVSE is typically supplied by the vehicle owner. The lock for the lock box 16 is also typically supplied by the vehicle owner.

Figure 11:
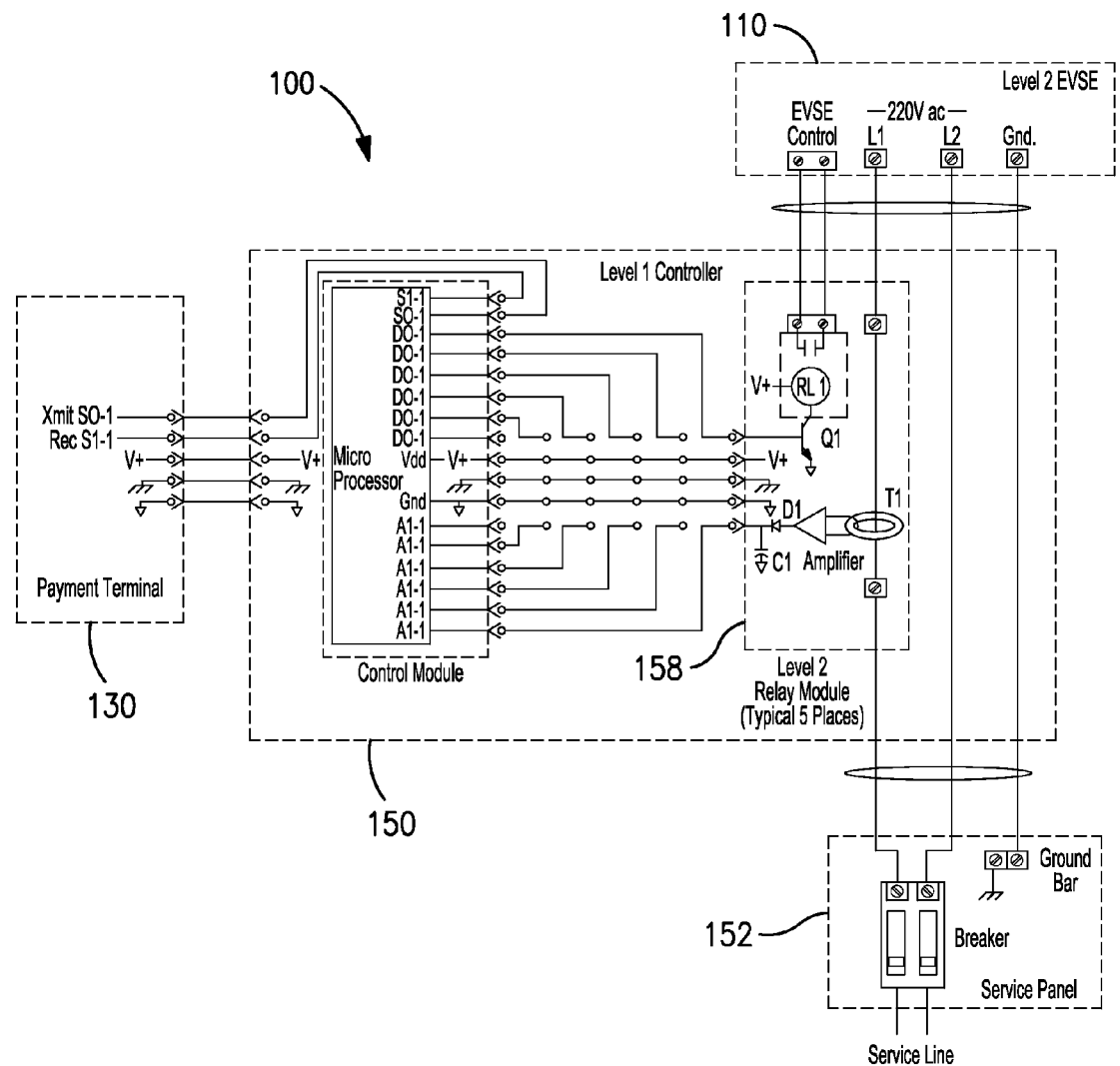
FIG. 11 is a schematic diagram of a controller system for a level 2 EVSE.
Figure 12:
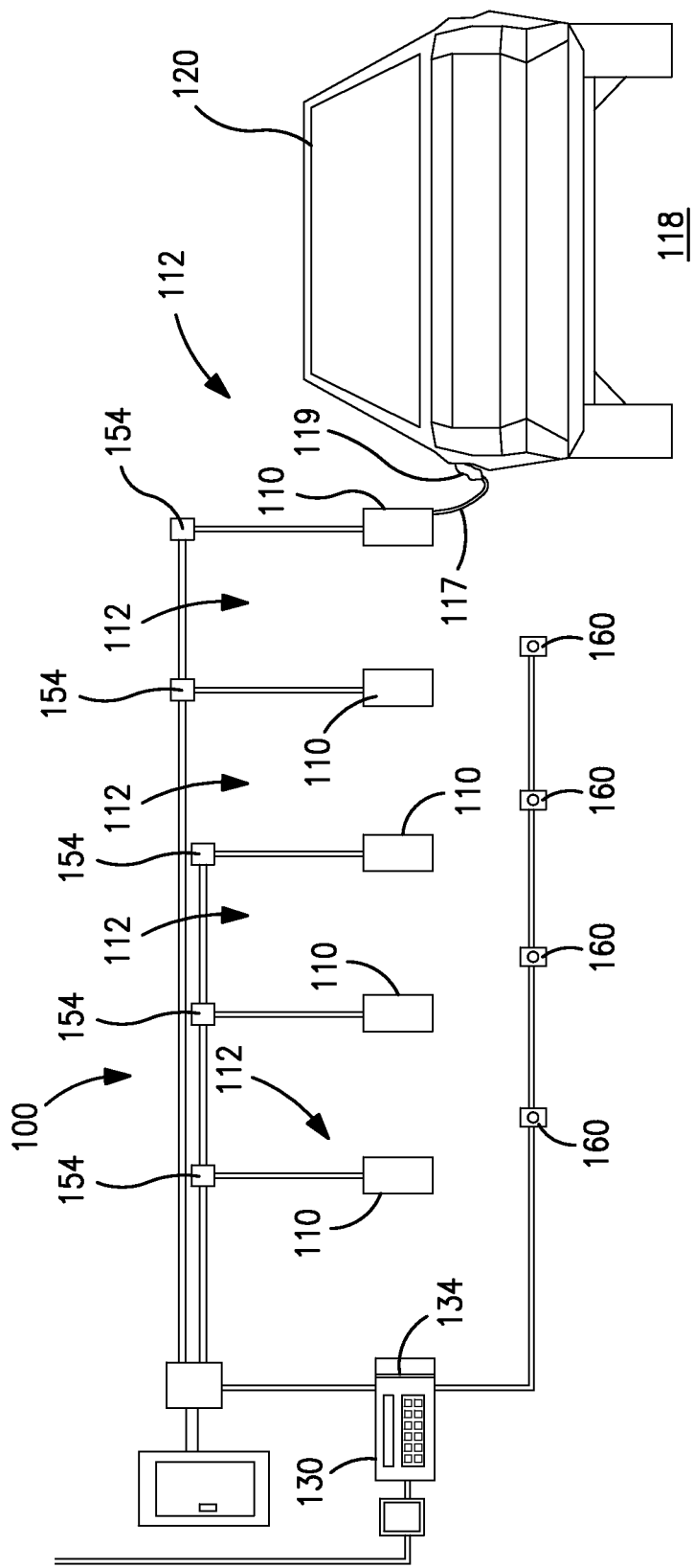
FIG. 12 is a schematic view of a controller system for a level 2 EVSE as incorporated into a multiple station installation for charging an electric vehicle.
Figure 13:
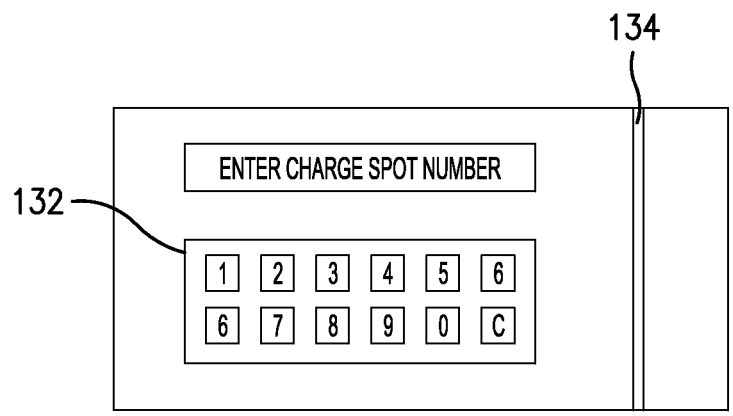
FIG. 13 is a front view of a payment terminal for the controller system of FIG. 12.
Figure 14:
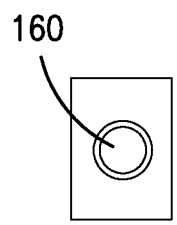
FIG. 14 is a front view of an ultrasonic sensor employed in a vehicle detector for the controller system of FIG. 12.
Figure 15:
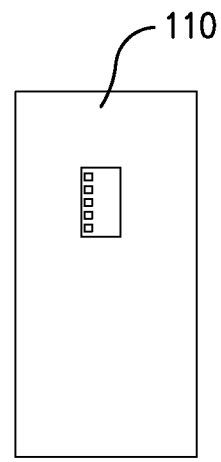
FIG. 15 is a front view of a level 2 EVSE employed in the controller system of FIG. 12.

With reference to FIGS. 11 and 12, a controller system for a level 2 EVSE is generally designated by the numeral 100. Permanently mounted level 2 EVSE designated generally by the numeral 110 are provided at each of the charging stations 112. Each charging station has an associated parking space. Each EVSE 110 includes a cord end 117 with a J1772 connector 119 for connecting with the battery charging terminal of the electric vehicle 120.

The payment station 130 also includes a keyboard 132 for entering the parking space number, as well as a card reader 134. A CAS module 136 may also be included. The payment station 130 communicates with a level 2 controller 150. The payment or authorization station 130 provides input to the controller 150 for authorizing the supply of power for a selected charging station 112.

An ultrasonic or other vehicle sensor 160 is provided for each of the parking spaces. Vehicle sensor 160 generates a presence signal input via the payment station 130 to the level 2 EVSE controller 150. The EVSE controller 150 connects with the electric service panel 152 to supply power to the junction boxes 154 for connection with each of the EVSE 110. When the vehicle leaves the parking space 118, the ultrasonic sensor 160 transmits a signal (ceases generating a presence signal) which ultimately causes the EVSE controller 150 to terminate the supply of electric power to the specific EVSE 110. Typically 220 volt AC power is delivered and is controlled by a relay 158 in the level 2 EVSE controller 150.

Figure 10:
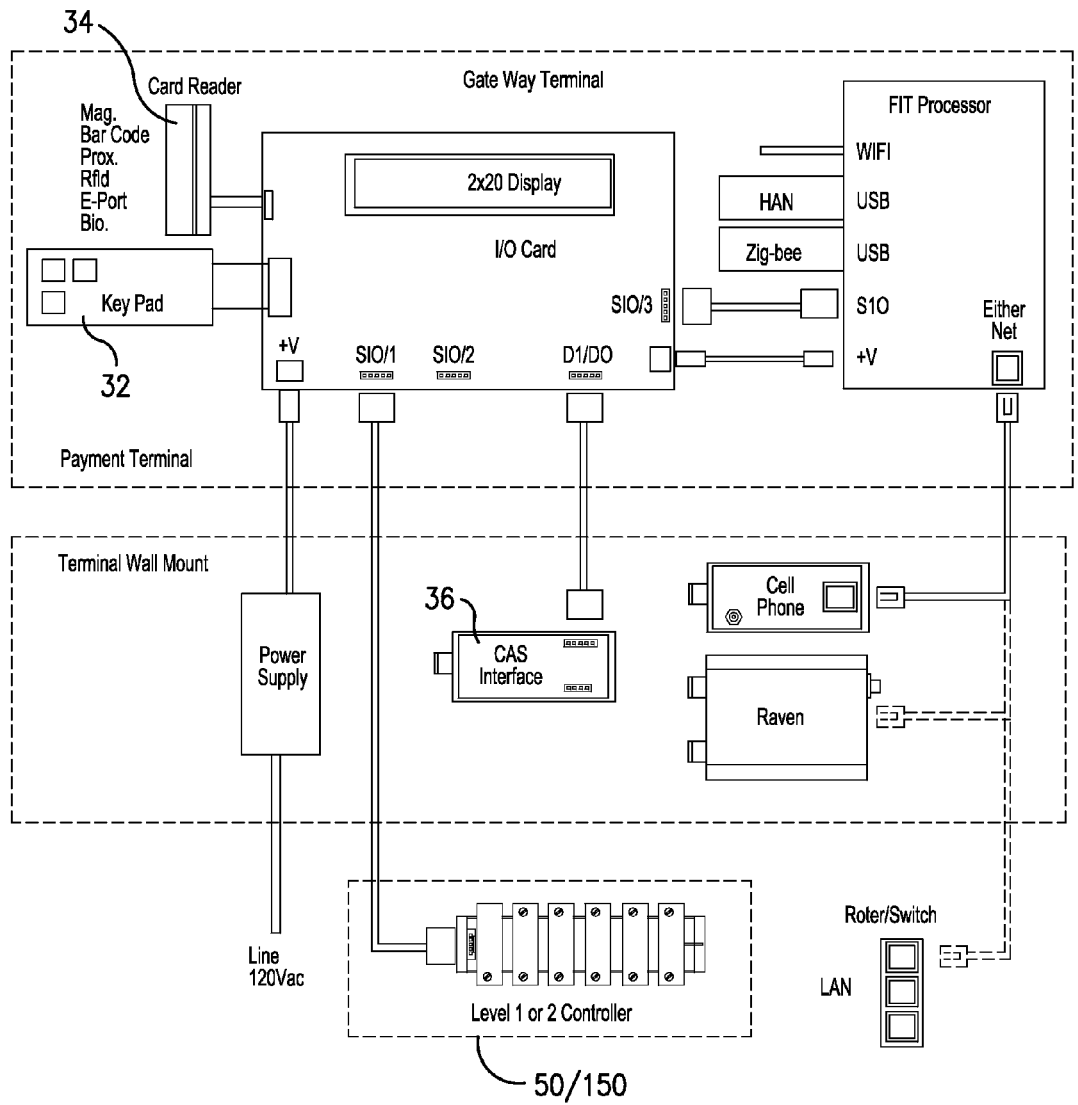
FIG. 10 is a block diagram for a gateway terminal incorporating either a level 1 or level 2 controller.
Figure 16:
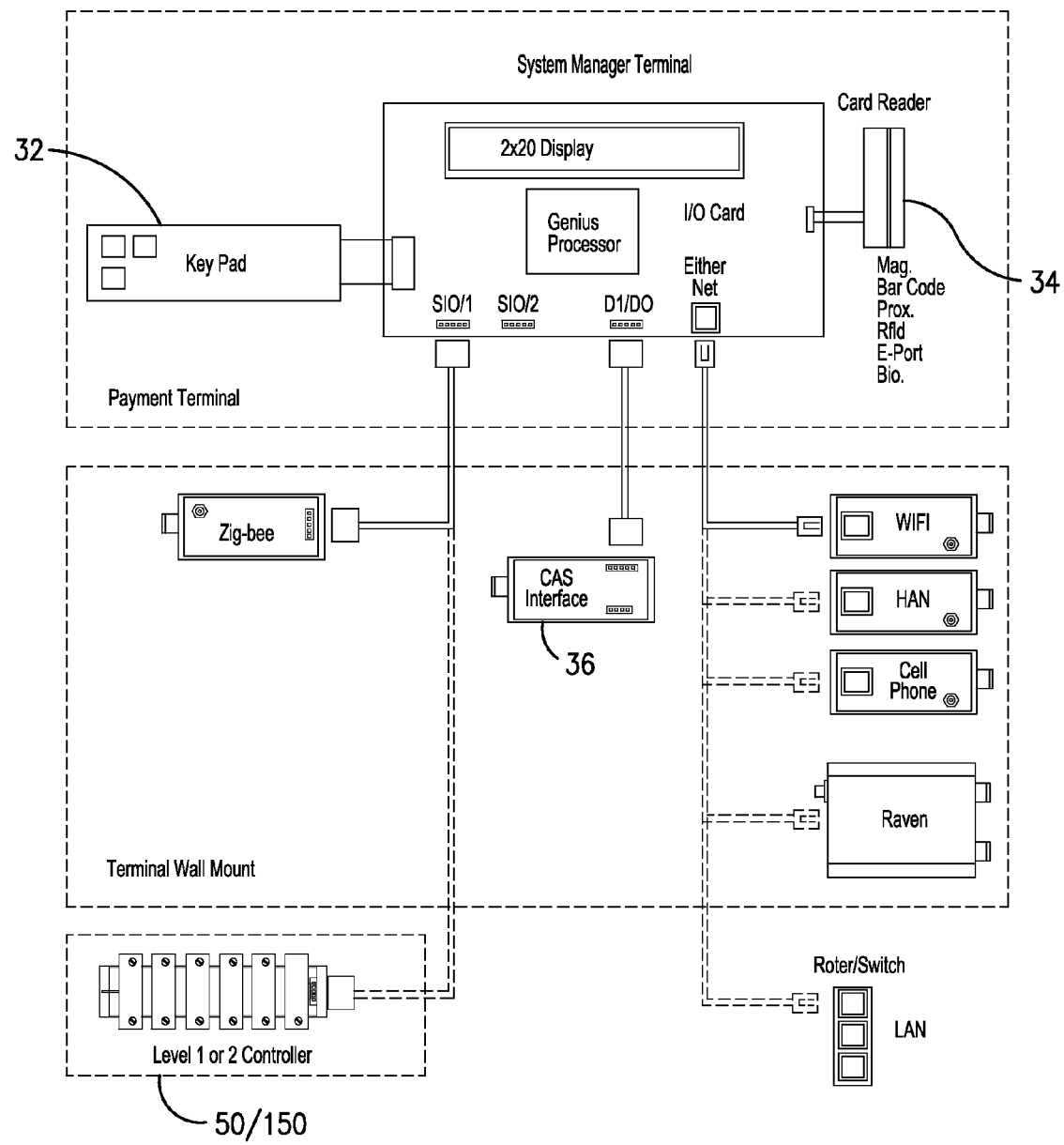
FIG. 16 is a block diagram of a system manager terminal which incorporates either a level 1 or level 2 EVSE controller system.

It will be appreciated that either the level 1 controller 50 or the level 2 EVSE controller 150 can be readily incorporated into either a gateway terminal such as illustrated in FIG. 10 or a system manager terminal such as illustrated in FIG. 16. The level 1 or level 2 controller is merely a plug in module which is connected to either the input/output card of the gateway terminal of the Genus® processor. All of the other features, such as connection to the Ethernet, of the gateway terminal and the assistant manager terminal can be effectively exploited and employed in connection with either the level 1 controller 50 or the level 2 EVSE controller 150.

The invention claimed is:

1. An EVSE controller system comprising:
   an EVSE charging station comprising an electrical outlet and an EVSE secured receptacle adjacent said outlet;
   a power line connected to supply electrical power to said outlet;
   an EVSE controller interposed in said power line for selectively controlling the flow of power to said outlet;
   an authorization station configured to receive input from a vehicle operator and provide an authorization input to said EVSE controller;
   a vehicle detector for detecting the presence of a vehicle at said charging station,
   wherein an operator input at said authorization station generates an authorization signal to said controller to provide a flow of power to said station outlet, and said vehicle sensor provides an input for terminating authorization at said EVSE controller if said vehicle leaves said charging station.

2. The controller system of claim 1 wherein said vehicle detector is an ultrasonic sensor.

3. The controller system of claim 1 wherein said authorization station comprises a keyboard and a reader.

4. The controller system of claim 1 wherein said secured receptacle is a lock box and further comprising a level 1 EVSE received in said lock box and connected to said charging station outlet and having a cord extendable from said lock box for connecting with the battery charging terminal of an electric vehicle.

5. The controller system of claim 1 further comprising a plurality of charging stations each connected to said EVSE controller and a plurality of vehicle detectors corresponding to each charging station and communicating with said authorization station for terminating authorization at said EVSE controller if a vehicle leaves said charging station.

6. The EVSE controller system of claim 1 further comprising an LED lamp which indicates that power is supplied to said outlet.

7. The EVSE controller system of claim 1 wherein said authorization station includes an input module for entering a specific parking space identification.

8. The EVSE controller system of claim 1 wherein said authorization station comprises a card reader.

9. The EVSE controller system of claim 1 wherein said authorization station further comprises a controlled access module.

10. A controller system for a level 2 EVSE comprising:
a charging station comprising a level 2 EVSE mounted in a fixed position relative to an adjacent parking space;
a power line connected to supply power to said charging station;
an EVSE controller interposed in said power line for selectively allowing power to be supplied to said charging station;
an authorization station communicating with said EVSE controller;
a vehicle sensor for sensing the presence of a vehicle at said parking space,
wherein an input at said authorization station generates a signal to the EVSE controller to supply power to said charging station, and said vehicle sensor provides a signal so that when a vehicle is no longer detected at said parking space, said EVSE controller terminates power to said charging station.

11. The controller system of claim 10 wherein said vehicle detector is an ultrasonic sensor.

12. The controller system of claim 10 and further comprising a plurality of charging stations, each with a level 2 EVSE and each connected for receiving power via said EVSE controller.

13. The controller system of claim 10 wherein said authorization station comprises a keyboard with keys identifying or entering the identification of various parking spaces corresponding to said charging stations.

14. The EVSE controller system of claim 10 further comprising an LED which indicates that power is supplied to said EVSE.

15. The EVSE controller system of claim 10 wherein said authorization station includes an input module for entering a specific parking space identification.

16. The EVSE controller system of claim 10 wherein said authorization station comprises a card reader.

17. A method for charging an electric vehicle comprising:
inputting information to authorize the usage of electric power at a charging station;
controlling the supply of power at said charging station in response to the authorization;
connecting an electric vehicle to supply power at said charging station;
automatically detecting the presence of the electric vehicle at the charging station;
charging the electric vehicle at said charging station; and
automatically terminating the supply of power to said charging station upon sensing the electric vehicle has left the charging station.

18. The method of claim 17 further comprising:
connecting an EVSE to power at a charging station;
placing the EVSE in a secured enclosure;
securing the EVSE in the enclosure; and
connecting the EVSE to the battery charging terminal of the electric vehicle.

19. The method of claim 17 further comprising selecting a specific charging station and inputting information to authorize the usage of electric power at the selected charging station.

20. The method of claim 19 wherein the step of inputting information further comprises reading a card.

* * * * *